(12) United States Patent
Anderson

(10) Patent No.: US 7,770,787 B2
(45) Date of Patent: Aug. 10, 2010

(54) CREDENTIAL COMMUNICATION DEVICE

(75) Inventor: Mark Anderson, Edinburgh (AU)

(73) Assignee: The Commonwealth of Australia (AU)

( * ) Notice: Subject to any disclaimer, the term of this patent is extended or adjusted under 35 U.S.C. 154(b) by 1080 days.

(21) Appl. No.: 10/559,984

(22) PCT Filed: Jun. 10, 2004

(86) PCT No.: PCT/AU2004/000762

§ 371 (c)(1),
(2), (4) Date: Mar. 27, 2006

(87) PCT Pub. No.: WO2004/109973

PCT Pub. Date: Dec. 16, 2004

(65) Prior Publication Data

US 2006/0180658 A1    Aug. 17, 2006

(30) Foreign Application Priority Data

Jun. 11, 2003    (AU) ............................... 2003902911

(51) Int. Cl.
*G06K 5/00* (2006.01)
(52) U.S. Cl. .................... 235/380; 235/375; 235/382
(58) Field of Classification Search .................. 235/380, 235/375, 487, 382
See application file for complete search history.

(56) References Cited

U.S. PATENT DOCUMENTS

| | | | |
|---|---|---|---|
| 5,796,827 A | 8/1998 | Coppersmith et al. | |
| 6,058,304 A | 5/2000 | Callaghan et al. | |
| 6,340,116 B1 | 1/2002 | Cecil et al. | |
| 6,584,301 B1 | 6/2003 | Bohn et al. | |
| 6,745,944 B2 * | 6/2004 | Dell ........................... | 235/492 |
| 7,155,199 B2 * | 12/2006 | Zalewski et al. ............ | 455/403 |
| 7,303,120 B2 * | 12/2007 | Beenau et al. .............. | 235/380 |
| 2004/0064728 A1 | 4/2004 | Scheurich | |

FOREIGN PATENT DOCUMENTS

| | | |
|---|---|---|
| CA | 2 142 227 A1 | 8/1996 |
| EP | 1 098 252 A1 | 5/2001 |
| JP | 2003-190228 A | 7/2003 |
| WO | WO 99/17566 A2 | 4/1999 |
| WO | WO 00/39750 A1 | 7/2000 |
| WO | WO 01/18754 A1 | 3/2001 |
| WO | WO 03/063074 A1 | 7/2003 |

* cited by examiner

*Primary Examiner*—Ahshik Kim
(74) *Attorney, Agent, or Firm*—Craig A. Fieschko, Esq.; DeWitt Ross & Stevens S.C.

(57) ABSTRACT

A credential communication device and method adapted to transmit and receive data, including means to process said data in order to effect credential verification and trusted mutual recognition between the device and a second credential communication device, without reference to a third party, further including at least one proximity conductor adapted to transfer at least some data only when in such physical proximity to a second credential communication device as to effectively exclude the possibility of third party involvement in the transaction.

34 Claims, 3 Drawing Sheets

CREDENTIAL COMMUNICATION DEVICE

TECHNICAL FIELD

This invention relates to the field of personal identification and credential communication.

BACKGROUND ART

There are many examples of authentication devices and electronic methods of credential exchange. These typically involve a trade-off between security, flexibility and ease of use. For example, a smart card transaction requiring that the card be inserted into a reader gives high confidence that the communication between the card and the reader involves only those two parties, but is relatively inconvenient. A transaction involving a wireless reader such as that used in some subway ticketing system does not even require the user to take the card from their wallet, but unauthorised and undetected third party involvement would be quite straightforward.

Further, these devices typically require an access point where a network function or access point function undertakes the credential processing. Thus a client appliance identifies itself to a master device which then applies pre-selected protocols to the transaction based on that identification. Peer to peer authentication is not catered for. For example, in the case of a credit card or smart card, they are placed within an ATM or other network active receptacle which undertakes the required processing. No transaction is possible between such cards in the absence of a network.

Nor is mutual suspicion credential exchange possible. The client must trust the master and identify itself to the master. This is not a problem where the master device is part of a fixed installation which serves to establish that it is bona fide. This becomes much more problematic when both devices are mobile.

In addition, the user selectable features are a part of the network rather than a property of the card itself.

There is a need for a limited use "business card" and identification token for organisations where personnel may not necessarily know each other but need to know role information such as security clearances, financial approval authorisations, access rights or medical treatment records. It is useful to provide for token to token exchange which establishes user and organisation selectable bona fides of the two parties.

In this process, the touching of the tokens or rather the very close proximity of the tokens must be such that each user can be assured that only those tokens are participating in the process. Otherwise spoofing may be possible by third party wireless systems acting in variations of classic "man in the middle" or classic "hijack" attacks.

For example, in the Defence domain, two people who meet without formal notification of clearance details but with such tokens could exchange credentials which were signed by the Defence Certification Authority and could therefore calculate the level of information they were permitted to discuss.

In a hospital a doctor could authorise a drug treatment by signing an order, and could check that the doctor had prescribe rights at that hospital.

DISCLOSURE OF THE INVENTION

In one form of the invention, although this need not be the only of the broadest form, it can be said to reside in a set of devices where a first of the devices is adapted to hold information in an electronic storage and effect transmission of such information upon a triggering of such transmission, and a second device is adapted to hold data in an electronic storage and adapted to receive transmissions from said first device and effect a comparison of such received data with that being held by said second device and when such received data is matching preselected criteria effect an output signal to this effect, the respective devices being adapted to effect a transmission and receiving between the devices only when in a selected range of distance apart or when touching.

In preference said devices are adapted to effect credential accreditation information.

In preference, the devices have a range of transmission and reception such that they will only transmit and receive at least some data only when in such physical proximity as to effectively exclude the possibility of third party involvement in the transaction.

In a further form of the invention, it can be said to reside in a credential exchange device, said device including a proximity conductor adapted to transfer at least some data only when in such physical proximity to a second credential exchange device as to effectively exclude the possibility of third party involvement in the transaction.

In a further form of the invention, it may be said to reside in a credential communication device including at least one proximity conductor adapted to transfer at least some data only when in such physical proximity to a second credential exchange device as to effectively exclude the possibility of third party involvement in the transaction, said data being adapted to effect trusted mutual recognition between the device and the second device, without reference to a third party.

In preference, the credential communication device is adapted to require a participant to authenticate their identity immediately before communication with the second device.

In preference the credential communication device is adapted to accept identity authentication by the keying of a pass code into the device.

In preference, the credential communication device is adapted to accept identity authentication by use of a biometric authentication apparatus.

In preference the proximity connector is an induction connection.

In preference, the induction connection is effected by a RF transceiver of such power as to require the physical proximity to be such as approximates physical touch.

In preference the power setting for the proximity conductor is settable so that sufficient power is available to transmit and receive preamble data before physical contact is established, and at the time when physical contact or close proximity is required the power setting is reduced to a level which enures that such close proximity is assured.

In preference, the proximity conductor includes means to detect that physical touch is being maintained between the device and the second device, the device further adapted to transfer some data only when such touch is detected.

In preference the means to detect physical touch is a pressure sensor.

In preference the induction connector is protected from physical or environmental damage by thin layer or shell of material.

In preference, the device includes means to communicate the results of credential verification.

In preference said communication means includes at least one trusted light indicator.

In preference said communication means includes at least three separately identifiable light indicators.

In preference said light indicators are formed as bands around the device to facilitate visibility from multiple angles.

In preference said light indicators are light emitting diodes.

In preference, the device further includes a trusted alphanumeric display.

In preference the device further includes a biometric authentication apparatus.

In preference said biometric authentication apparatus is a fingerprint scanner.

In preference the device further includes means for receiving wireless transmissions from a distance further than the range of the proximity conductor.

In preference the proximity conductor is a bulbous structure, permitting momentary contact with a second device from a variety of angles.

In preference the device is approximately cylindrical.

In preference, in the alternative, the proximity conductor is located on the shaft of a cylinder, permitting momentary contact with a second device from a variety of angles.

In a further form of the invention, it can be said to reside in a method for mutual suspicion credential exchange including the steps of:

positioning a credential exchange device to touch or come into close proximity with a second such device, the credential exchange device transmitting data to and receiving data from the second device, the credential exchange device processing received data to determine the credential status of the second device, the credential exchange device outputting the results of the credential determination.

In a further form of the invention, it can be said to reside in a method for mutual suspicion credential exchange including the steps of:

providing each participant with a credential exchange device loading the credential exchange device with credential data relevant to a user, each participant operating their device to seek appropriate credential data from a second device, each participant positioning their device to touch or come into close proximity with a second device, each device transmitting data to and receiving data from a second device, each device processing received data to determine the credential status of the second device, each device outputting the results of the credential determination.

In preference the method further includes the steps of communicating an organisational mandatory security policy to the credential exchange device, and the device applying said mandatory security policy to the data transmitted to the second device. This communication may be restricted to being a one-off process performed when the device is manufactured or first activated.

In preference the method further includes the steps of communicating a user discretionary security policy to the credential exchange device, and the device applying said user discretionary security policy to the data transmitted to the second device. This communication may be restricted to being a one-off process performed when the device is manufactured or first activated.

In preference a mandatory security policy may be communicated to the credential communication device by means localised to the particular location in which the device is operating.

In preference, said policy communication is by secure wireless means.

Trusted appliances which are able to communicate securely together in a manner such that no other device can intrude are known as an ensemble. There can be only one appliance of each type in an ensemble.

In preference the credential communication device is a component in a mutually authenticated ensemble of devices where it may signal a trusted remote visual display device to display data.

In preference the remote visual display device is a badge display.

In preference, the method of credential exchange includes the step of the credential communication device signalling via secure wireless means to the remote visual display means in its own ensemble a visual depiction of the participant associated with the second device.

In a further form of the invention, it may be said to reside in a method for rapid verification of the credentials for a group of participants by a guard including the steps of:

providing each participant and the guard with a credential communication device, said device including a proximity conductor adapted to transfer at least some data only when in such physical proximity to a second credential exchange device as to effectively exclude the possibility of third party involvement in the transaction said device further including memory means and processing means and output means, loading each participant's credential communication devices with data including the identity and credentials of the participant, operating the guard's device to cause it to seek appropriate identity or credential data from a participant's device, positioning each participant's device to touch or come into close proximity with the guard's device, transmitting data and receiving data between the guard's and the participant's devices, the guard's device processing received data to determine the credential status of the participant's device, the guard's device outputting the results of the credential determination.

In preference, a passive device is provided to extend the area in which proximity to the guard's device is sufficient for the proximity conductor to operate.

In preference the passive device is a waveguide, adapted to allow the guard's credential communication to be inserted into it.

In preference, each participant passes their credential communication device through the waveguide to communicate their credentials.

In preference the guard's device is a component in an ensemble including a remote visual display device.

In preference, the method of credential verification includes the step of the guard's credential communication device signalling via secure wireless means to the remote visual display means in its own ensemble a visual depiction of the participant associated with the participant's device.

Trusted appliances which are able to communicate securely together in a manner such that no other device can intrude are known as an ensemble. There can be only one appliance of each type in an ensemble.

In a further form of the invention the credential communication device is a component in a mutually authenticated ensemble of devices where it may signal a trusted remote visual display device to display data.

In preference the remote visual display device is a badge display.

In a preferred embodiment the credential exchange device has a cylindrical form factor and is referred to as a code stick. The code stick is a portable tamper resistant trusted device which is used for personal identification, credential warrants, and credential exchange. In a preferred embodiment of the code stick it would comprise a handheld device with an inductive connector, one or more trusted input switches, one or more trusted light displays such as a light "bands" to permit viewing from multiple angles, a trusted display such as a transflective backlightable LCD display, an untrusted wheel press button, an untrusted audio generator, and a wireless network interface such as Bluetooth or 802.11 ethernet. In addition, code sticks may be fitted with an optional light meter which can be used to detect when backlighting is needed in an automatic fashion.

In a preferred embodiment of the code stick it may choose to use its wireless interface to signal via trusted means another audio device such as a wireless speaker device "button" to generate audio tones and signals.

For practical use the code stick should be manufactured to be easily held by the hand and to be stored in a garment pocket. In a preferred embodiment of the code stick it may be constructed in the form of a cylinder with the inductive connector at one end covering the tip (typically bulbous shaped), and optionally parts of the cylinder side. This permits ease of momentary connection between code sticks from a variety of angles.

The light bands running around a circumference of the cylinder can be manufactured via a variety of methods. One typical method is to implement a number of LED device around such a circumference.

A user must authenticate to the code stick before use. In a preferred embodiment of the device either a PIN style number can be entered via the trusted input keys, or through an embedded biometric element such as a fingerprint reader, or a combination. After authentication the user has a certain amount of time to undertake the transaction before the device "times out" and re-authentication is required. For code sticks which have an embedded wireless element, a secure (e.g encrypted with authentication functions) "heartbeat" signal can be received from other trusted devices to delay activation of the timeout.

The most typical use of the code stick in a defence context is to check each other's clearances and identity without the intervention of a third party.

For example, two people may meet for various discussions. During the course of these discussions, it becomes apparent that both parties may benefit from a discussion at the secret level on a particular project. Each party may then undertake the following process:

a) Authenticate to their respective code sticks;

b) Via manipulation of the trusted buttons or wheel each selects a question to ask the other code stick which in this case is do they have secret clearances;

c) Each party touches code sticks for a period of time until the code stick signals via a visual means such as the light bands or an audio tone that sufficient data has been transferred between the code sticks;

d) The code sticks then processes the data and signals to the respective user either success or failure of whether the other party has a secret clearance. This signalling can be either the trusted band lights, or on the trusted visual display, or a combination. Note that an audio tone is insufficient as this could be spoofed by a number of means.

The touching of the tokens or rather the very close proximity of the tokens must be such that each user can be assured that only those code sticks are participating in the process.

In order to optimise the data transfer point to point the power settings for the proximity conductor can be settable so that preamble data can be transmitted and received and at the time requirement for close physical proximity the power settings reduced.

The process above can be augmented in a number of ways. For example, as part of the mutual authentication process the code stick could transmit via a wireless interface the visual identity of the other party to a "badge" device. The badge device, is a trusted device which has an electronic display and wireless means. Via a secure protocol, it can authenticate and transmit and receive data from a specific code stick. Trusted appliances which are able to communicate securely together in a manner such that no other device can intrude are known as an ensemble. There can be only one appliance of each type in an ensemble. In the case of visual checking, the code stick transmits information to the active badge appliance in its ensemble. The visual contains a visual identity of the other party. Note that it is essential that the visual transmitted to its ensemble partner is that of the other party, otherwise it may be possible to introduce a spoofing attack.

A further possible augmentation is to add a pressure sensitive surface or membrane to the inductive connector so that actual physical contact with each code stick is detected as part of the process. Although the threat is small, this prevents high energy RF devices from simulating very close proximity to another device.

While the input switched can be used in a combination method to provide some form of PIN style authentication, in a preferred embodiment of the code stick, it would be fitted with a biometric device such as a fingerprint reader to form part of the user authentication requirement to the code stick.

Each code stick can contain a user discretionary security policy, and an organisational mandatory security policy.

The mandatory security policy restricts what the user can transact with other code sticks. For example, a user may wish to disclose they have a Top Secret clearance to another code stick holder. However, the mandatory security policy loaded in the code stick may state that disclosure of Top Secret clearances can only be disclosed to code stick holders who are Australian citizens. If the user selects Top Secret for disclosing, and a transaction with a code stick held by a foreign holder takes place, the mandatory security policy may override the user's selection and disclose only a secret level clearance.

A user discretionary security policy can be used for the user to set defaults. For example, if a code stick touch takes place without specific user selections, then a standard Secret level clearance may be disclosed to the other party, despite the code stick user holding a Top Secret clearance.

The mandatory security policy can also operate when attendees on entering a room their code sticks are notified by a trusted wireless device in the room that the room can only hold conversation at, say, the secret level. This mandatory security policy may then override code stick settings or transactions. Alternatively, a user may request the current security context by manipulating the code stick to search for and obtain any mandatory requirements from other trusted devices. For example, a trusted device located in a meeting room may be broadcasting the security context that the room is equipped to handle conversations up to the secret level via a wireless interface and that no one is to exchange credentials above this level. The broadcast is via encrypted, authenticated protocols which can be verified by code sticks. On entering the room, an attendee's code stick receives this broadcast and matches to the policy. If an attendee attempts to exchange, say, notification of Top Secret clearances with other attendee's code stick, the code stick will refuse to do so.

BRIEF DESCRIPTION OF THE DRAWINGS

Embodiments of the invention will now be described with the assistance of drawings in which.

BEST METHOD FOR CARRYING OUT THE INVENTION

Figure 1:
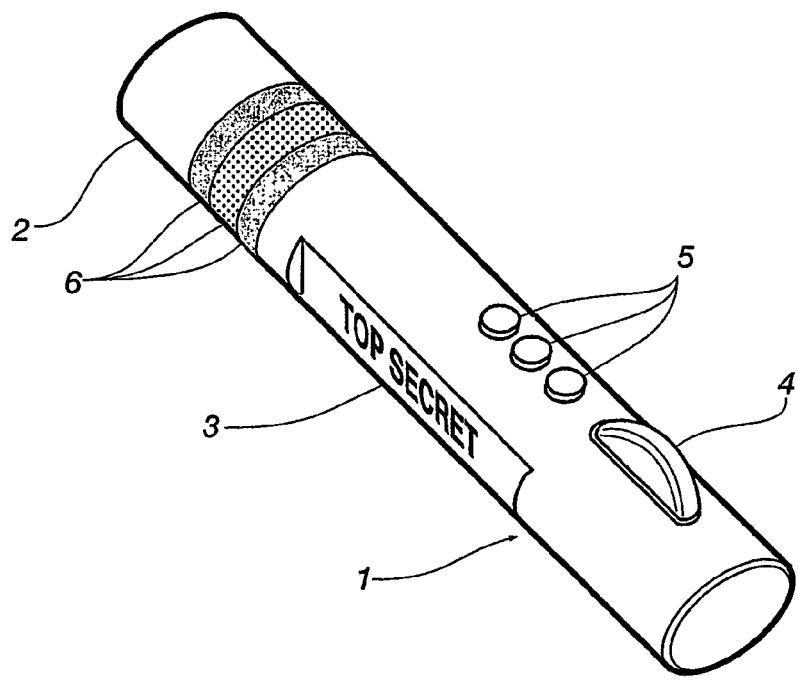
FIG. 1 is a representation of the credential communication device in a code stick form factor.

FIG. 1 shows a credential communication device constructed according to the invention. It has a cylindrical, tamper resistant casing 1 and is of a size to be conveniently held in the hand or stored in a garment pocket. This size and shape is referred to as the code stick form factor, and such a device as a code stick.

The code stick includes a proximity conductor in the form of an inductive connector 2, which is situated at the bulbous end of the code stick in order to facilitate ease of touching to other devices.

The code stick also includes a transreflective backlightable LCD display 3 and an untrusted audio generator for output. Further output options are provided by three light bands 6 which encirle the body of the code stick. These are each made up of multiple light emitting diodes.

For data input, the device has a combined jog wheel and press button 4 and three press buttons 5.

Wireless communication with the code stick is provided by an 802.11 ethernet connection. In a further embodiment, this wireless communication link is provided by a Blue tooth interface. It will be appreciated that any proprietary or non-proprietary wireless communications protocol may be used.

Figure 2:
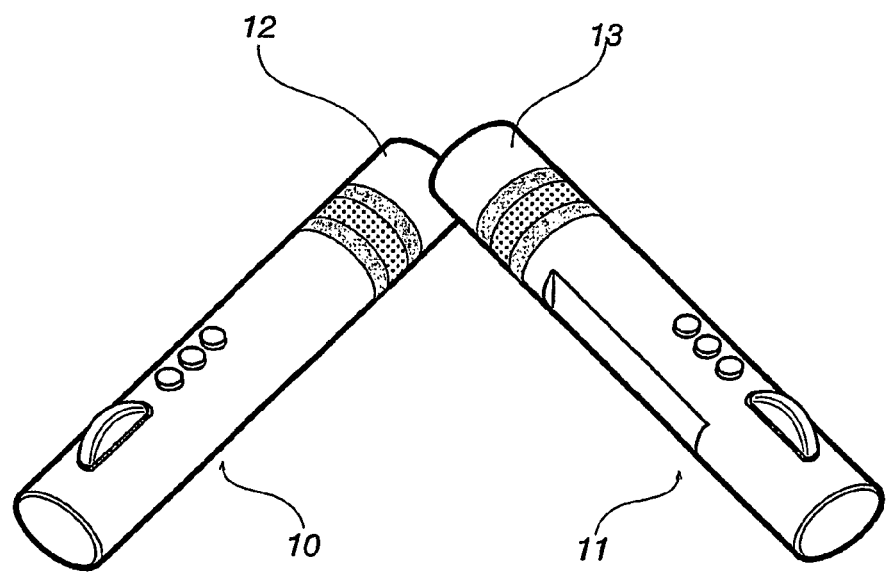
FIG. 2 shows two code sticks in use.
Figure 3:
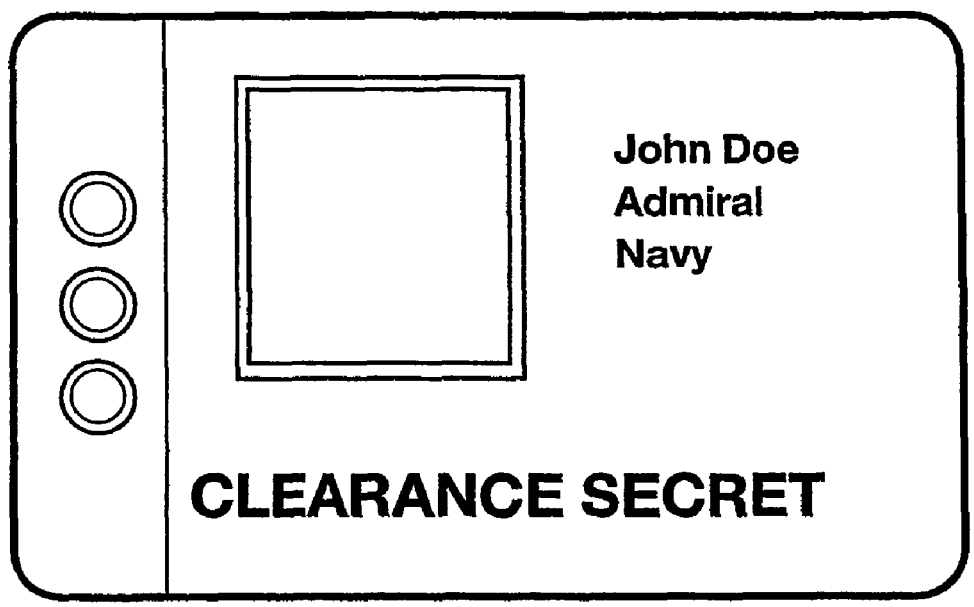
FIG. 3 shows the remote visual display apparatus in a badge form factor.

FIG. 2 shows the device in use. There are two code stick devices 10, 11, each with a proximity conductor 12,13. These conductors are momentarily brought together to allow communication between the devices.

For example, two people may meet for various discussions. During the course of these discussions, it becomes apparent that both parties may benefit from a discussion at the secret level on a particular project. Each party then undertakes a process described in the following steps.

They each authenticate to their respective code sticks, by entering a pass code identification sequence. In a further embodiment (not shown) the code stick includes a biometric authentication device such as a fingerprint scanner which is used for this step, either alone or in combination with the pass code.

Via manipulation of the push buttons or wheel each selects a question to ask the other code stick which in this case is do they have "secret" clearance.

Each party touches code sticks for a period of time until the code stick signals via a visual means such as the light bands or an audio tone that sufficient data has been transferred between the code sticks.

The code sticks then process the data and then each signals to the respective user either success or failure of verification that the other party has a "secret" clearance. This signalling can be either the trusted band lights, or on the trusted visual display, or a combination. Note that an audio tone is insufficient as this could be spoofed by a number of means.

A user must authenticate to the code stick before use. After authentication the user has a certain amount of time to undertake the transaction before the device "times out" and re-authentication is required. The code stick is adapted to receive, via the wireless communication link, a secure (e.g. encrypted with authentication functions) "heartbeat" signal from other trusted devices to delay activation of the timeout. This allows for multiple transactions to be conveniently carried out.

Figure 4:
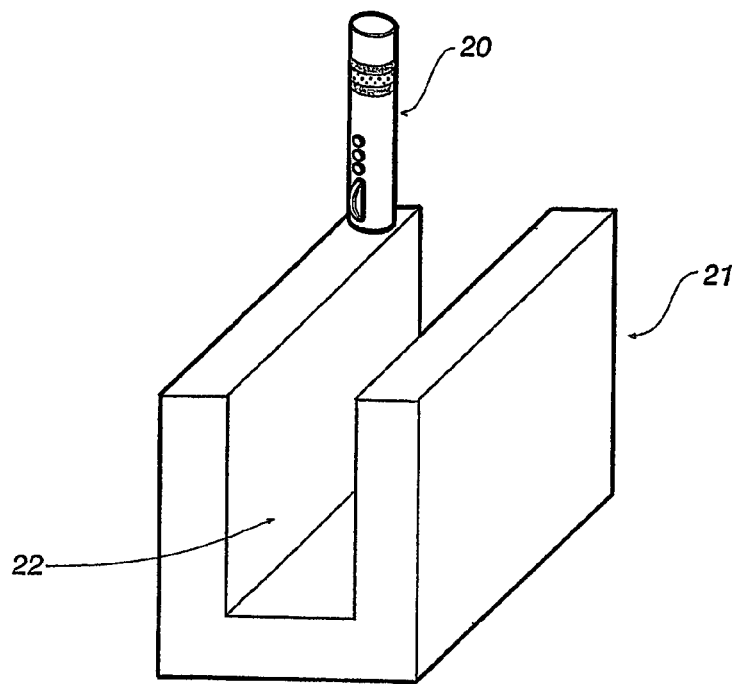
FIG. 4 shows an embodiment including a waveguide for extending the area in which close proximity contact is possible.

In a further embodiment, a badge device as shown in FIG. 4 is included. This device is capable of establishing a secure wireless connection to one and only one code stick device. Via a secure protocol, it can authenticate and transmit and receive data from a specific code stick. Trusted appliances which are able to communicate securely together in a manner such that no other device can intrude are known as an ensemble. There can be only one appliance of each type in an ensemble. In the case of visual checking, the code stick transmits information to the active badge appliance in its ensemble. The visual contains a visual identity of the other party. Note that it is essential that the visual transmitted to its ensemble partner is that of the other party, otherwise it may be possible to introduce a spoofing attack.

In a further embodiment (not shown) there is a pressure sensitive surface or membrane included in the inductive connector so that actual physical contact with each code stick is detected as part of the process. Although the threat is small, this prevents high energy RF devices from simulating very close proximity to another code stick device.

Figure 5:
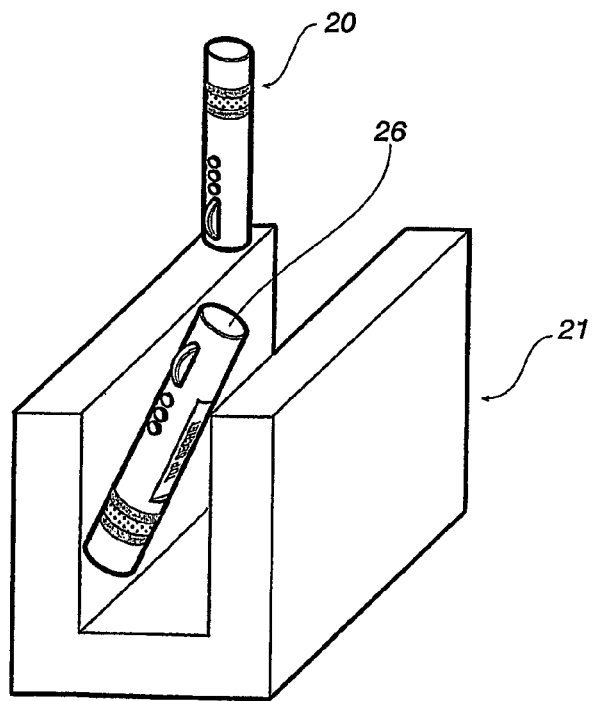
FIG. 5 shows the embodiment of FIG. 4 in use.

An additional embodiment is illustrated in FIG. 5. The credential communication device system can be used for the rapid checking of large numbers of personnel credentials for closed meeting attendance. This is currently typically done by attendees presenting a badge or identification pass. When several hundred are involved, it can overload the guards checking each attendee's credentials. A typical example in Defence is checking participant's clearance level to "secret" for attendance at classified functions. The checking method is accomplished using the steps set out below.

The Guard selects the criteria required for admittance, e.g. secret clearance and communicates this selection to a code stick device.

The Guard then inserts the code stick 20 into a slot 22 in a passive waveguide device 21. This waveguide restricts the range of the wireless communication link of the guard's code stick to the area of the channel 22 of the waveguide.

Each participant, having authenticated to their own code stick, swipes or sweeps their code stick 26 through the waveguide device as shown in FIG. 5. The two code sticks communicate via their secure wireless communication links.

The localisation of the signals by the waveguide provides the guarantee that there is no third party involved in the transaction.

The Guard's device undertakes an interrogation via the wireless communication link as the participant's code stick is swept through the waveguide utilising variations of previously described methods and signals either success or failure via a trusted visual means on the Guard's code stick accompanied by an optional untrusted audio tone.

An alternative embodiment (not shown) has two receptacles, one for the Guard's code stick, and the other for the meeting attendee. The attendee inserts their code stick into the designated receptacle and removes it at a given signal. The design of the receptacles is such that the close proximity method is achieved and thus a wireless connection is not needed.

With many wireless implementations, the length of time to gain a "data lock", i.e. the length of time for two devices to recognise each other and set up a transfer link may be of the order of seconds. This is typically too long for the applications in mind. A method of avoiding this delay is for the Guard's code stick to transmit to a radius out of the waveguide its synchronisation sequences but only receive data within the waveguide. Another alternative is for the Guard's device to have multiple wireless interfaces to achieve the same effect. This permits other code sticks in the vicinity to "lock in" before they are swept through the waveguide. When swept through the waveguide they are already synchronised for data transfer.

Throughout this specification the purpose of the description has been to illustrate the invention and not to limit this.

The invention claimed is:

1. A credential communication device adapted to transmit and receive data, including:
   a. means to process said data in order to effect mutual credential verification and mutual recognition between the device and a second credential communication device, without reference to a third party,
   b. at least one proximity conductor adapted to be controlled to transmit and receive at least some data,
   c. means to effect variation in the power output of the proximity conductor in relation to the data to be transmitted, wherein in use:
      (1) selected data, which is data whose unauthorized reception is acceptable, is transmitted by the proximity conductor at such power as to be received by the second credential communication device before the credential exchange device establishes a physical proximity to the second credential communication device that effectively excludes the possibility of third party involvement in the transmission and reception of data, and
      (2) other selected data, which is data whose unauthorized reception is not acceptable, is transmitted by the proximity conductor at such a power as to be received by the second credential communication device only when the credential exchange device is in such physical proximity to the second credential exchange device that the possibility of third party involvement in the transmission and reception of data is effectively excluded.

2. A credential communication device as in claim 1, further adapted to require a user of the device to authenticate the user's identity to the credential communication device immediately before communication with the second credential communication device.

3. A credential communication device as in claim 1 further adapted to accept identity authentication by the keying of a pass code into the device.

4. A credential communication device as in claim 1 further adapted to accept identity authentication by use of a biometric authentication apparatus.

5. A credential communication device as in claim 1 wherein the proximity connector is an induction connection.

6. A credential communication device as in claim 5, wherein the induction connection is effected by a RF transceiver of such power as to require the physical proximity to approximate physical touch.

7. A credential communication device as in claim 1 wherein the proximity conductor is protected from physical or environmental damage by a thin layer or shell of material.

8. A credential communication device as in claim 1 including means to communicate the results of processing to effect credential verification.

9. A credential communication device as in claim 8 wherein said communication means includes at least one light indicator.

10. A credential communication device as in claim 8 wherein said communication means include an alpha-numeric display.

11. A credential communication device as in claim 1 further including an alpha-numeric display.

12. A credential communication device as in claim 1 further including a biometric authentication apparatus.

13. A credential communication device as in claim 12 wherein said biometric authentication apparatus is a fingerprint scanner.

14. A credential communication device as in claim 1 wherein the device is a component in a mutually authenticated ensemble of devices, the device being adapted to effect data display on a remote visual display device.

15. A credential communication device as in claim 14 wherein the remote visual display device is a badge display.

16. A credential communication device adapted to transmit and receive data, including:
   a. means to process said data in order to effect mutual credential verification and mutual recognition between the device and a second credential communication device, without reference to a third party,
   b. at least one proximity conductor adapted to be controlled to transmit and receive at least some data only when in such physical proximity to a second credential communication device as to effectively exclude the possibility of third party involvement in the transmission and reception of said data,
      wherein the proximity conductor includes a detector adapted to detect that physical touch is being maintained between the device and a second device, the device further adapted to transfer some data only when such touch is detected.

17. A credential communication device as in claim 16 wherein the detector adapted to detect physical touch is a pressure sensor.

18. A credential communication device adapted to transmit and receive data, including:
   a. means to process said data in order to effect mutual credential verification and mutual recognition between the device and a second credential communication device, without reference to a third party,
   b. at least one proximity conductor adapted to be controlled to transmit and receive at least some data only when in such physical proximity to a second credential communication device as to effectively exclude the possibility of third party involvement in the transmission and reception of said data, wherein said communication means includes at least three separately identifiable light indicators, and c. means to communicate the results of processing to effect credential verification.

19. A credential communication device as in claim 18 wherein said light indicators are formed as bands around the device to facilitate visibility from multiple angles.

20. A credential communication device as in claim 19 wherein said light indicators are light emitting diodes.

21. A credential communication device adapted to transmit and receive data, including:

a. means to process said data in order to effect mutual credential verification and mutual recognition between the device and a second credential communication device, without reference to a third party, b. at least one proximity conductor adapted to be controlled to transmit and receive at least some data only when in such physical proximity to a second credential communication device as to effectively exclude the possibility of third party involvement in the transmission and reception of said data, wherein:

(1) the device is approximately cylindrical, and (2) the proximity conductor is a bulbous structure located on the shaft of said approximately cylindrical structure, permitting momentary contact with a second credential communication device from a variety of angles.

22. A method for rapid verification of the credentials of a group of participants by a guard including the steps of:

providing each participant and the guard with a credential communication device as in claim 1, loading each participant's credential communication devices with data including the identity and credentials of the participant, operating the guard's device to cause the device to seek appropriate identity or credential data from a participant's device, positioning each participant's device to touch or come into close proximity with the guard's device, transmitting data and receiving data between the guard's and the participant's devices, the guard's device processing received data to determine the credential status of the participant's device, the guard's device outputting the results of the credential determination.

23. The method of claim 22 further including the step of providing a passive device adapted to extend the area in which proximity to the guard's device is sufficient for the proximity conductor to operate.

24. The method of claim 23 wherein the passive device is a waveguide, adapted to allow the guard's credential communication to be inserted into the waveguide, further including the step of each participant passing the participant's credential communication device through the waveguide to communicate the participant's credentials.

25. The method of claim 22 wherein the guard's device is a component in an ensemble including a remote visual display device and further including the step of the guard's credential communication device signalling via secure wireless means to the remote visual display means a visual depiction of the participant associated with the participant's device.

26. A credential communication device adapted to transmit and receive data, including:

a. means to process said data in order to effect mutual credential verification and mutual recognition between the device and a second credential communication device, without reference to a third party, b. at least one proximity conductor adapted to be controlled to transmit and receive at least some data only when in such physical proximity to a second credential communication device as to effectively exclude the possibility of third party involvement in the transmission and reception of said data, wherein the proximity conductor is a bulbous structure, permitting momentary contact with a second credential communication device from a variety of angles.

27. A method for mutual suspicion credential exchange including the steps of:

providing each participant with a credential exchange device as in claim 1, loading the credential exchange device with credential data relevant to a user, each participant operating the participant's device to seek appropriate credential data from a second device, each participant positioning the participant's device to touch or come into close proximity with a second device, each device transmitting data to and receiving data from a second device, each device processing received data to determine the credential status of the second device, each device outputting the results of the credential determination.

28. The method of claim 27 further including the steps of communicating an organizational mandatory security policy to the credential exchange device, and the device applying said mandatory security policy to the data transmitted to the second device.

29. The method of claim 28 wherein the communication of the organizational mandatory security policy is restricted to being a one-off process performed when the device is manufactured or first activated.

30. The method of claim 28 wherein the mandatory security policy is communicated to the credential communication device by means localized to the particular location in which the device is operating.

31. The method of claim 30 wherein said policy communication is by secure wireless means.

32. The method of claim 27 further including the steps of communicating a user discretionary security policy to the credential exchange device, and the device applying said user discretionary security policy to the data transmitted to the second device.

33. The method of claim 32 wherein the communication of the user discretionary security policy occurs only once, and occurs upon manufacture or first activation of the device.

34. The method of claim 27 including the step of the credential communication device signalling via secure wireless means to a remote visual display means a visual depiction of the participant associated with the second device.

* * * * *